US011649009B2

(12) United States Patent
Kaltenbach et al.

(10) Patent No.: US 11,649,009 B2
(45) Date of Patent: May 16, 2023

(54) TRANSMISSION FOR A BICYCLE

(71) Applicant: ZF Friedrichshafen AG, Friedrichshafen (DE)

(72) Inventors: Johannes Kaltenbach, Friedrichshafen (DE); Valerie Engel, Markdorf (DE); Uwe Griesmeier, Markdorf (DE); Matthias Wesa, Ravensburg (DE); Michael Wechs, Weißensberg (DE); Jens Moraw, Markdorf (DE); Gerhard Niederbrucker, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 102 days.

(21) Appl. No.: 16/470,020

(22) PCT Filed: Nov. 27, 2017

(86) PCT No.: PCT/EP2017/080448
§ 371 (c)(1),
(2) Date: Jun. 14, 2019

(87) PCT Pub. No.: WO2018/108496
PCT Pub. Date: Jun. 21, 2018

(65) Prior Publication Data
US 2019/0351972 A1 Nov. 21, 2019

(30) Foreign Application Priority Data
Dec. 15, 2016 (DE) .................... 10 2016 225 169.4

(51) Int. Cl.
B62M 11/18 (2006.01)
F16H 3/66 (2006.01)
(Continued)

(52) U.S. Cl.
CPC ............ *B62M 11/145* (2013.01); *B62M 6/55* (2013.01); *B62M 11/18* (2013.01); *F16H 3/66* (2013.01);
(Continued)

(58) Field of Classification Search
CPC ............... F16H 3/66; F16H 2200/0043; F16H 2200/006; F16H 2200/2007;
(Continued)

(56) References Cited

U.S. PATENT DOCUMENTS 4,721,015 A 1/1988 Hartmann
6,258,005 B1 7/2001 Rohloff
(Continued)

FOREIGN PATENT DOCUMENTS

DE 19720794 A1 11/1998
DE 19720796 A1 11/1998
(Continued)

OTHER PUBLICATIONS

Machine translation of DE102014223334 filed Apr. 14, 2021 (Year: 2021).*

(Continued)

*Primary Examiner* — Tisha D Lewis
(74) *Attorney, Agent, or Firm* — Dority & Manning, P.A.

(57) ABSTRACT

A transmission for a bicycle includes at least four shift elements, one input shaft (1), a first planetary gear set (PS1) which is operatively connected to the input shaft (1), and a second planetary gear set (PS2). A carrier of the first planetary gear set is rotationally fixed to a carrier of the second planetary gear set (PS2).

17 Claims, 5 Drawing Sheets

(51) Int. Cl.
*B62M 11/14* (2006.01)
*B62M 6/55* (2010.01)

(52) U.S. Cl.
CPC .............. *F16H 2200/006* (2013.01); *F16H 2200/0043* (2013.01); *F16H 2200/201* (2013.01); *F16H 2200/2007* (2013.01); *F16H 2200/2041* (2013.01); *F16H 2200/2046* (2013.01); *F16H 2200/2071* (2013.01); *F16H 2200/2087* (2013.01)

(58) Field of Classification Search
CPC ....... F16H 2200/201; F16H 2200/2041; F16H 2200/2046; F16H 2200/2071; F16H 2200/2087; B62M 11/14; B62M 11/145; B62M 11/18
See application file for complete search history.

(56) References Cited

U.S. PATENT DOCUMENTS

| | | | | |
|---|---|---|---|---|
| 6,958,031 B2* | 10/2005 | Diosi | ............... | F16H 3/66 475/276 |
| 2011/0177911 A1 | 7/2011 | Serkh et al. | | |
| 2011/0241306 A1* | 10/2011 | Serkh | ............... | B62M 11/145 280/261 |
| 2012/0010038 A1* | 1/2012 | Hart | ............... | F16H 3/666 475/296 |
| 2012/0071290 A1 | 3/2012 | Byun | | |
| 2012/0172171 A1 | 7/2012 | Byun | | |
| 2014/0364271 A1* | 12/2014 | Kaltenbach | ............... | F16H 3/006 475/286 |
| 2019/0193812 A1* | 6/2019 | Hinterkausen | ............... | F16H 37/065 |

FOREIGN PATENT DOCUMENTS

| | | | |
|---|---|---|---|
| DE | 102014101726 A1 | | 8/2015 |
| DE | 102014223334 A1 | | 5/2016 |
| JP | 2014224547 A | * | 12/2014 ............... F16H 3/66 |
| KR | 20140131433 A | | 11/2014 |

OTHER PUBLICATIONS

DE 102014101726A1 machine translation filed Sep. 1, 2021. (Year: 2021).*
German Search Report DE102016225169.4, dated Sep. 1, 2017. (12 pages).
International Search Report (English Translation) PCT/EP2017/080448, dated Jan. 30, 2018. (3 pages).

* cited by examiner

| | S1 | S2 | S3 | S4 | i |
|---|---|---|---|---|---|
| 1st Gear | | | X | X | 1.00 |
| 2nd Gear | X | | X | | 0.78 |
| 3rd Gear | | X | | X | 0.63 |
| 4th Gear | X | X | | | 0.49 |

| | PS1 | PS2 | PS3 |
|---|---|---|---|
| | 2.00 | -2.6 | -1.6 |

Fig. 5

| | S1 | S2 | S3 | S4 | S6 | S5 | i |
|---|---|---|---|---|---|---|---|
| 1st Gear | | | X | X | X | | 1.00 |
| 2nd Gear | X | | X | | X | | 0.78 |
| 3rd Gear | | X | | X | X | | 0.63 |
| 4th Gear | X | X | | | X | | 0.49 |
| 5th Gear | | | X | X | | X | 0.38 |
| 6th Gear | X | | X | | | X | 0.30 |
| 7th Gear | | X | | X | | X | 0.24 |
| 8th Gear | X | X | | | | X | 0.19 |

Fig. 6

TRANSMISSION FOR A BICYCLE

FIELD OF THE INVENTION

The invention relates generally to a transmission for a bicycle that includes at least four shift elements, one input shaft, a first planetary gear set which is operatively connected to the input shaft, and a second planetary gear set.

The invention also relates generally to a bottom bracket that includes such a transmission. In addition, the invention relates generally to a bicycle that includes the transmission or the bottom bracket.

BACKGROUND

A plurality of transmissions is known from the prior art. For example, a transmission is known from US 2011 177 911 A1, which includes three series-connected planetary transmissions having a speed increasing ratio. The transmission encompasses a total of seven gear planes, including numerous stepped planetary gears, and so the transmission has a complex design and, therefore, the effort required to assemble the transmission is very high.

SUMMARY OF THE INVENTION

Example aspects of the invention provide a transmission which has a simple configuration and can be easily assembled.

In example embodiments, a transmission that includes at least four shift elements, one input shaft, a first planetary gear set which is operatively connected to the input shaft, and a second planetary gear set, is characterized in that a carrier of the first planetary gear set is rotationally fixed to a carrier of the second planetary gear set.

The transmission according to example aspects of the invention has the advantage that a 4-speed transmission can be made available, which requires no stepped planetary gears. The transmission has a simple configuration and the assembly of the transmission can take place quickly. In addition, the transmission has good efficiency. The transmission according to the invention also has the advantage that it is suitable for an application in a bicycle, in particular in connection with a front-mounted splitter group/unit or a rear-mounted splitter group/unit.

A shaft is not to be understood exclusively as a, for example, cylindrical, rotatably mounted machine element for transmitting torques, but rather is to be understood to also be general connecting elements which connect individual components or elements to one another, in particular, connecting elements which connect multiple elements to one another in a rotationally fixed manner.

In one particular embodiment, the carrier of the first planetary gear set and the carrier of the second planetary gear set are designed as one piece. The one-piece embodiment offers the advantage that a shared component may be utilized for both planetary gear sets, whereby the costs of the transmission are reduced and the assembly is simplified. In addition, the transmission becomes more compact due to the shared component.

The first planetary gear set may be a plus planetary gear set and/or the second planetary gear set may be a minus planetary gear set. A minus planetary gear set corresponds to a planetary gear set that includes a carrier, on which the planetary gears are rotatably mounted, and that includes a sun gear and a ring gear, wherein the tooth system of at least one of the planetary gears intermeshes with the tooth system of the sun gear as well as with the tooth system of the ring gear, whereby the ring gear and the sun gear rotate in opposite directions when the sun gear rotates while the carrier is held.

In contrast thereto, a plus planetary gear set differs from the minus planetary gear set in that the plus planetary gear set includes inner and outer planetary gears which are rotatably mounted on the carrier. The tooth system of the inner planetary gears intermeshes, in this case, with the tooth system of the sun gear, on the one hand, and with the tooth system of the outer planetary gears, on the other hand. In addition, the tooth system of the outer planetary gears intermeshes with the tooth system of the ring gear. As a result, the ring gear and the sun gear rotate in the same direction of rotation when the carrier is held.

The input shaft may be rotationally fixed to a ring gear of the first planetary gear set. In addition, the input shaft may be operatively connected and operatively connectable to the second planetary gear set. In particular, the input shaft may be operatively connected directly to the carrier of the second planetary gear set with the aid of the first planetary gear set.

In addition, a ring gear of the second planetary gear set may be rotationally fixable to the input shaft with the aid of a first shift element of the at least four shift elements and/or may be rotationally fixable to a transmission housing with the aid of a second shift element of the at least four shift elements. A sun gear of the second planetary gear set may be rotationally fixable to the transmission housing with the aid of a third shift element of the at least four shift elements.

The transmission housing may be an integral part of a bottom bracket shell, i.e., may be designed as one piece with the bottom bracket shell. Alternatively, the transmission housing may be designed separately from the bottom bracket shell and, in the assembled condition of the transmission, may be arranged in a cavity of the bottom bracket shell. The transmission housing may be designed and arranged in such a way that the transmission housing does not rotate during the operation of the transmission, but rather is stationary.

An output shaft of the transmission may be operatively connected to the first planetary gear set. In particular, the output shaft may be rotationally fixed to a sun gear of the first planetary gear set. In addition, the output shaft may be operatively connected and operatively connectable to the second planetary gear set. In particular, the output shaft may be rotationally fixable to a sun gear of the second planetary gear set with the aid of a fourth shift element of the at least four shift elements. In addition, a carrier of the second planetary gear set may be indirectly operatively connected to the output shaft with the aid of the first planetary gear set.

The transmission according to example aspects of the invention has the advantage that the shift elements are readily accessible to an actuator system. The second and the third shift elements may be designed as brakes and/or arranged in a radially outer area of the transmission, which simplifies the accessibility. The first and the fourth shift elements may each be designed as a clutch or a free-wheel unit. In an embodiment of the first and the fourth shift elements as a clutch in each case, neither an engagement or an actuator system are necessary. In addition, the first and the fourth shift elements have low supporting torques, and so the first and the fourth shift elements can be designed to be small.

The input shaft may be rotationally fixable to the crankshaft. In this embodiment, the output shaft may be rotationally fixed to a traction mechanism carrier, such as a sprocket or a belt pulley. In the case of a use of the transmission in the bicycle, a torque applied to the traction mechanism carrier may be transmitted to a rear wheel with the aid of a traction mechanism, such as a chain or a belt.

In the end, a transmission is realized, in which precisely four gears can be made available with the aid of precisely two planetary gear sets and/or precisely four shift elements. A first gear can be a direct gear, i.e., can have a ratio of one (1). The remaining gears can have a speed increasing ratio, i.e., a ratio of less than one (1).

In one particular embodiment, the transmission may include a third planetary gear set which is operatively connected to the first planetary gear set and/or to the second planetary gear set. The third planetary gear set may be drivingly connected upstream or downstream from the first and the second planetary gear sets. The third planetary gear set may be a minus planetary gear set.

A ring gear of the third planetary gear set may be rotationally fixable to the transmission housing with the aid of a fifth shift element. An element of the third planetary gear set may be rotationally fixable to another element of the third planetary gear set with the aid of a sixth shift element. When a sixth shift element is engaged, the third planetary gear set is interlocked, i.e., has a ratio of one (1).

The sixth shift element may be arranged in such a way that the ring gear of the third planetary gear set is rotationally fixable to a sun gear of the third planetary gear set. Such an arrangement has the advantage that the sixth shift element is to apply a small supporting torque. Alternatively, it is possible, of course, to arrange the sixth shift element in such a way that a carrier of the third planetary gear set is rotationally fixable to the ring gear of the third planetary gear set or to the sun gear of the third planetary gear set with the aid of the sixth shift element. The fifth shift element may be designed as a brake. The sixth shift element may be designed as a clutch or a free-wheel unit.

In one embodiment, during a traction operation, the third planetary gear set may be drivingly connected upstream from the first and the second planetary gear sets, i.e., may form a front-mounted splitter group. The first and the second planetary gear sets, the input shaft, the output shaft, and the four shift elements form a main group in this embodiment. A carrier of the third planetary gear set may be rotationally fixable to the crankshaft with the aid of a further input shaft. In addition, the sun gear of the third planetary gear set may be rotationally fixed to the input shaft. In this embodiment, the output shaft may be rotationally fixed to the traction mechanism carrier.

Alternatively, an embodiment is possible, in which, during a traction operation, the third planetary gear set is drivingly connected downstream from the first and the second planetary gear sets, i.e., forms a rear-mounted splitter group. The first and the second planetary gear sets, the input shaft, the output shaft, and the four shift elements form a main group in this embodiment. The output shaft may be rotationally fixed to a carrier of the third planetary gear set and/or a sun gear of the third planetary gear set may be rotationally fixed to a further output shaft. The further output shaft may be rotationally fixed to the traction mechanism carrier. In this embodiment, the input shaft may be rotationally fixable to the crankshaft.

The front-mounted splitter group or the rear-mounted splitter group can provide precisely two gears and/or include precisely two shift elements, namely the fifth and the sixth shift elements. A first gear can be a direct gear and a second gear can be a speed increasing ratio. The front-mounted splitter group or the rear-mounted splitter group may include precisely one planetary gear set, namely the third planetary gear set. In addition, the third planetary gear set does not include a stepped planetary gear.

Regardless of whether the transmission includes the front-mounted splitter group or the rear-mounted splitter group in addition to the main group, all variants yield the same transmission ratio range, i.e., the function of the transmission is identical, overall, in all variants. Differences exist in terms of the speed and torque ratios resulting at the individual planetary gear sets. Since the front-mounted splitter group or the rear-mounted splitter group, on the one hand, and the main group, on the other hand, includes the direct gear as the first gear, the torque load is similar in all variants. Greater differences result in the case of the speeds since the planetary gear sets positioned further toward the rear in the power flow are operated in some gears with an input speed which is already higher.

The shift elements utilized in the transmission, such as clutches or brakes, may be designed to be form-locking or friction-locking. If the aforementioned shift elements are each designed as free-wheel units, it is advantageous that, on the one hand, the main group and/or, on the other hand, the front-mounted splitter group or the rear-mounted splitter group are/is not interlocked, in order to prevent an interlock of the transmission in the event of a reversal of the direction of rotation at the input or at the output. This can be realized in that the fifth shift element of the front-mounted splitter group or the rear-mounted splitter group and/or the second and the third shift elements of the main group are designed as a unilaterally acting or freewheel brake, such as an engageable overrunning brake.

In the end, an 8-speed transmission can be realized by coupling the main group, which provides four gears, to a front-mounted splitter group or a rear-mounted splitter group, each of which provides two gears. The transmission is advantageous, since eight gears can be realized or implemented with the aid of precisely three planetary gear sets, and so the transmission has a short installation length. In addition, the transmission has suitable values for the stationary transmission ratios, and so the planetary gear sets can have a small diameter. One further advantage is that precisely three shift elements may be designed as brakes. The remaining shift elements may be designed as free-wheel units. This is advantageous since at least one, in particular precisely three, actuators must be present for actuating the three shift elements designed as brakes.

In one very particular embodiment, the transmission may include an electric machine which is operatively connected or may be operatively connected to the output shaft or to the further output shaft. The electric machine may be drivingly connected downstream from the first and/or the second and/or the third planetary gear set(s). The driving downstream connection of the electric machine offers the advantage that the planetary gear sets are not loaded with the torque provided by the electric machine. The electric machine also has the advantage that the electric machine can assist the cyclist in the operation. As a result, close gear steps are not necessary, since, due to the electric machine, muscle power has little significance for the propulsion.

The electric machine includes at least of a rotationally fixed stator and a rotatably mounted rotor and is configured for converting electrical energy into mechanical energy in the form of rotational speed and torque when operated as a motor and for converting mechanical energy into electrical energy in the form of current and voltage when operated as a generator.

The electric machine may be arranged so as to be offset, in particular in the radial direction, with respect to a central axis of the transmission and/or the crankshaft. In particular, a central axis of the electric machine may extend in parallel to a central axis of the transmission. This offers the advantage that the electric machine may be arranged in an area of the transmission and/or the bottom bracket shell, in which sufficient space is available for accommodating the electric machine. In addition, an inner diameter of the electric machine may be freely selected, since the crankshaft, which does not belong to the transmission, does not extend through the electric machine.

The connection of the electric machine to the output shaft or to the further output shaft may take place with the aid of a chain drive and/or a belt drive and/or a spur gear drive and/or a transmission gearing. In addition, a free-wheel unit may be arranged in the power flow between the electric machine and the output shaft or the further output shaft. The free-wheel unit offers the advantage that, during operation without the electric machine, no losses are caused by the concurrently-rotating rotor of the electric machine.

A bottom bracket that includes the transmission according to example aspects of the invention is very particularly advantageous, wherein the input shaft or the further input shaft is rotationally fixed to the crankshaft. The bottom bracket may include a bottom bracket shell, wherein the transmission is arranged in a cavity of the bottom bracket shell. The transmission may be modularly designed. Therefore, the transmission, in entirety, may be introduced into or removed from the cavity. A bicycle that includes the transmission or the bottom bracket is very particularly advantageous.

BRIEF DESCRIPTION OF THE DRAWINGS

The subject matter of example aspects of the invention is schematically represented in the figures and is described in the following with reference to the figures, wherein identical or identically operating elements are mostly provided with the same reference characters. Wherein:

FIG. 5: shows a table of values for the stationary transmission ratio of the three planetary gear sets, and FIG. 6: shows a shift pattern for the transmissions represented in FIGS. 3 and 4.

DETAILED DESCRIPTION

Figures 1, 2:
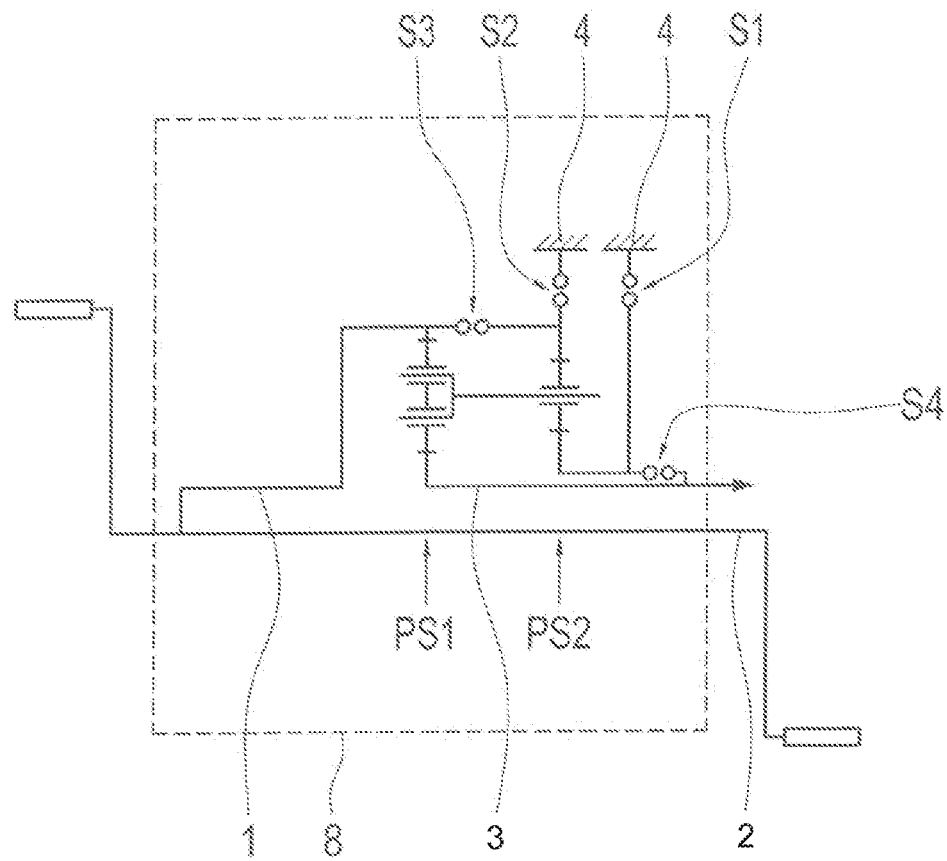
FIG. 1: shows a schematic of the transmission according to the invention, according to a first exemplary embodiment.
FIG. 2: shows a shift pattern of the transmission represented in FIG. 1, FIG. 3: shows a schematic of the transmission according to the invention, according to a second exemplary embodiment.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a transmission according to the invention, according to a first exemplary embodiment, which is rotationally symmetrical with respect to a crankshaft 2. Only the upper half of the transmission is represented in FIG. 1.

The transmission includes an input shaft 1 which is rotationally fixed to the crankshaft 2. In addition, the transmission includes a first planetary gear set PS1, which is operatively connected to the input shaft 1, and a second planetary gear set PS2. A carrier of the first planetary gear set PS1 is rotationally fixed to a carrier of the second planetary gear set PS2. In particular, the carrier of the first planetary gear set PS1 and the carrier of the second planetary gear set PS2 are designed as one piece, i.e., as a common component.

The first planetary gear set PS1 is designed as a plus planetary gear set and the second planetary gear set PS2 is designed as a minus planetary gear set. The input shaft 1 is rotationally fixed to a ring gear of the first planetary gear set PS1. A sun gear of the first planetary gear set PS1 is rotationally fixed to an output shaft 3.

A ring gear of the second planetary gear set P2 is rotationally fixable to the input shaft 1 with the aid of a first shift element S3. In addition, the ring gear of the second planetary gear set PS2 is rotationally fixable to a transmission housing 4 with the aid of a second shift element S2. A sun gear of the second planetary gear set PS2 is rotationally fixable to the transmission housing 4 with the aid of a third shift element S1 and is rotationally fixable to the output shaft 3 with the aid of a fourth shift element S4. The output shaft 3 is rotationally fixed to a traction mechanism carrier which is not represented in FIG. 1.

The first planetary gear set PS1 and the second planetary gear set PS2 are arranged coaxially to one another. In addition, the output shaft 3 is arranged coaxially to the crankshaft 2. The second shift element S2 and the third shift element S1 are each designed as brakes. The first shift element S3 and the fourth shift element S4 are each designed as clutches.

The transmission is arranged in a cavity of a bottom bracket shell 8. The transmission shown in FIG. 1 forms a main group HG which is operatively connected to further splitter groups, as is apparent from FIGS. 3 and 4.

FIG. 2 shows the shift pattern for the transmission represented in FIG. 1. The character "X" indicates the shift elements which are engaged in the particular gear. The shift elements are actuated with the aid of a suitable actuator system. In addition, the ratio "i" between the input shaft 1 and the output shaft 3 is indicated in FIG. 2 for each gear. As is apparent from FIG. 2, the transmission has four gears, wherein the first gear is a direct gear. A speed increasing ratio is implemented in the further gears.

In the transmission represented in FIG. 1, the first planetary gear set PS1 may have a stationary transmission ratio of two (2) and the second planetary gear set can have a stationary transmission ratio of negative two and six-tenths (−2.6). In the case of a minus planetary gear set, the stationary transmission ratio corresponds to the negative ratio of the number of teeth of the ring gear and the sun gear. In a plus planetary gear set, the stationary transmission ratio corresponds to the positive ratio of the number of teeth of the ring gear and the sun gear.

Figure 3:
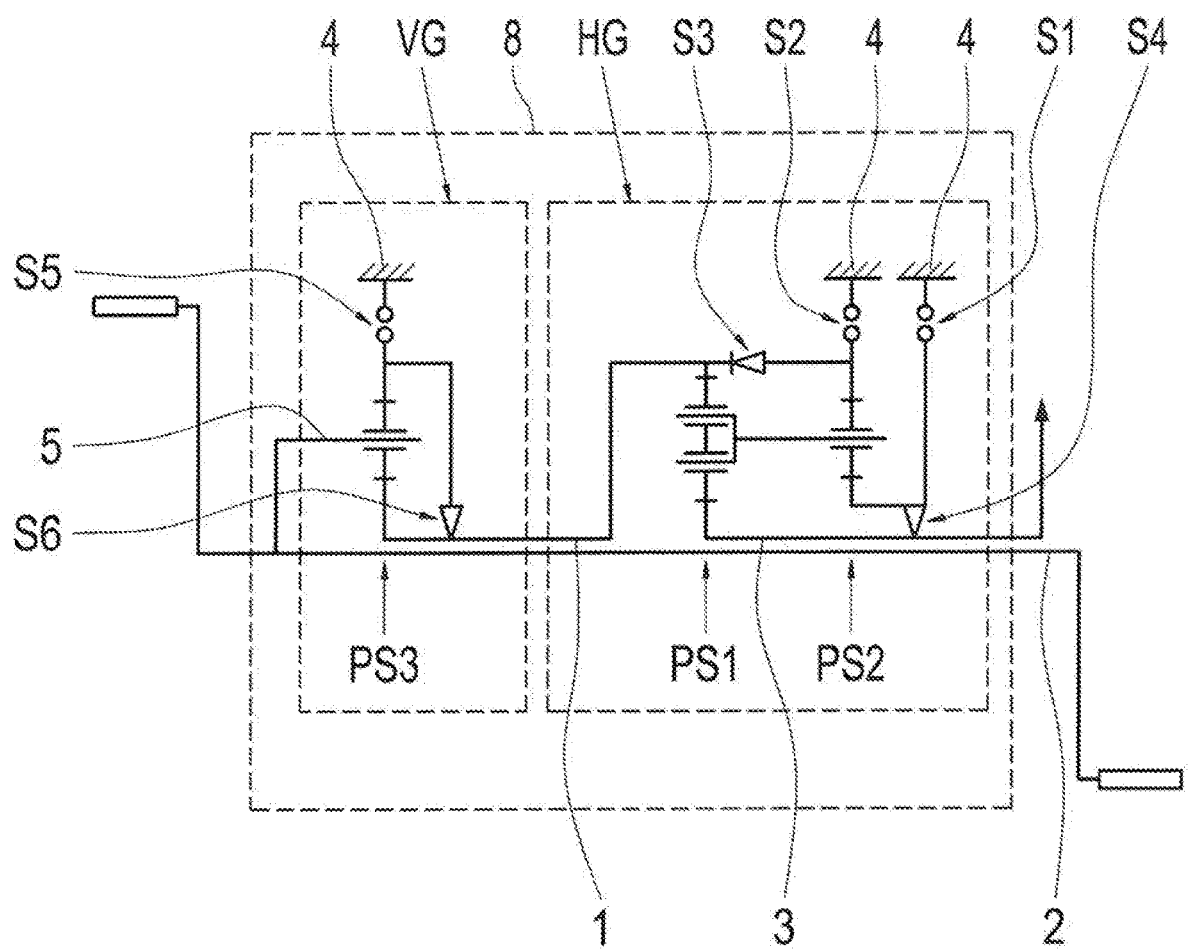

FIG. 3 shows the transmission according to the invention, according to a second exemplary embodiment. The transmission differs from the transmission represented in FIG. 1 in that the transmission includes a third planetary gear set PS3 which forms a front-mounted splitter group VG which is drivingly connected upstream from the main group HG. In particular, the third planetary gear set PS3 is drivingly connected upstream from the first planetary gear set PS1 and the second planetary gear set PS2, with respect to a power flow from the crankshaft 2 to the output shaft 3, during a traction operation.

A carrier of the third planetary gear set PS3 is rotationally fixed to the crankshaft 2 with the aid of a further input shaft 5. The input shaft 1 is rotationally fixed to a sun gear of the third planetary gear set PS3. A ring gear of the third planetary gear set PS3 is rotationally fixable to the transmission housing 4 with the aid of a fifth shift element S5. In addition, the ring gear is rotationally fixable to the sun gear of the third planetary gear set PS3 with the aid of a sixth shift element S6. The third planetary gear set PS3 is arranged coaxially to the first planetary gear set PS1 and/or the second planetary gear set PS2.

The fifth shift element S5 is designed as a brake and the sixth shift element S6 is designed as a free-wheel unit. One further difference from the transmission represented in FIG. 1 is that the first shift element S3 and the fourth shift element S4 are each designed as a free-wheel unit.

Figure 4:
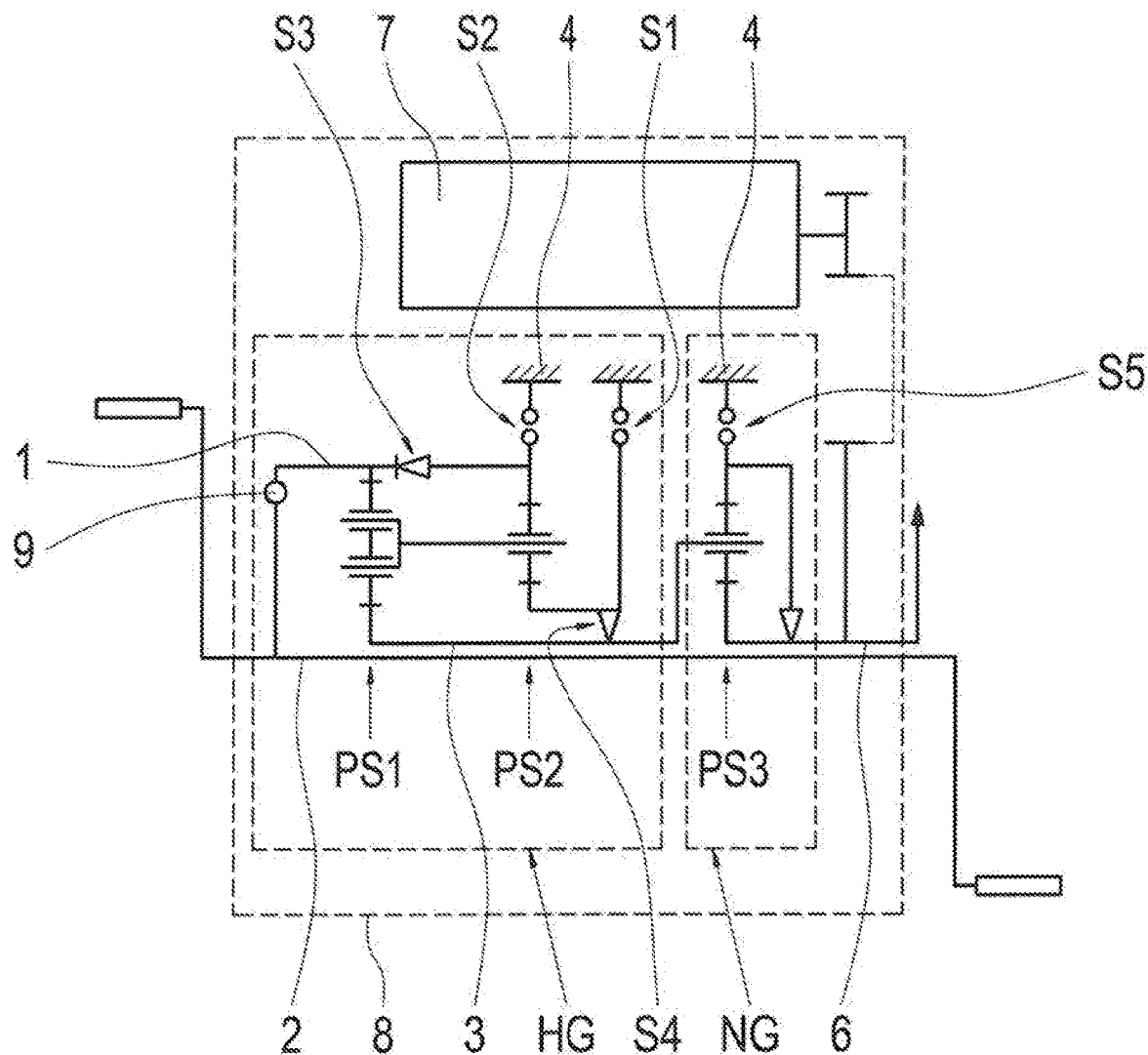
FIG. 4: shows a schematic of the transmission according to the invention, according to a third exemplary embodiment.
Figure 7:
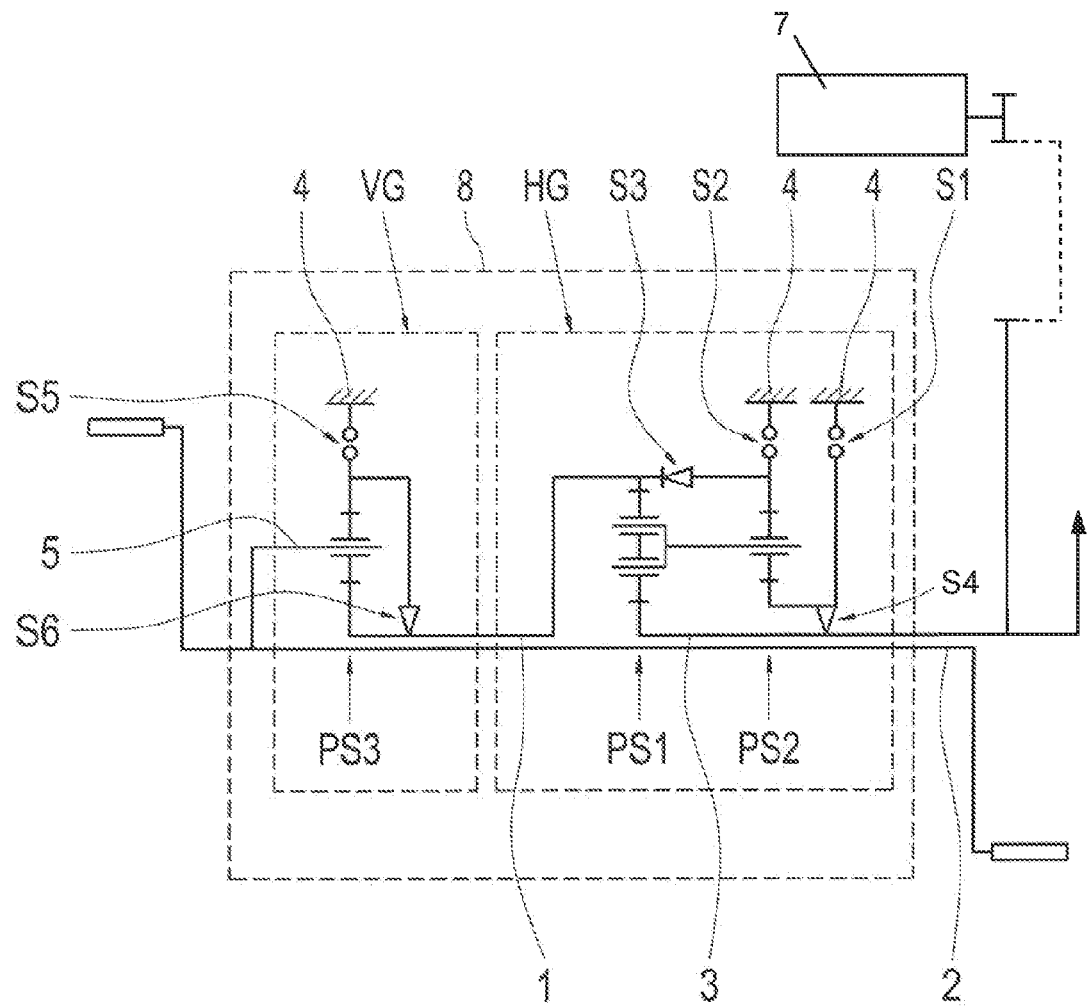
FIG. 7 shows a schematic of the example transmission of FIG. 3 with an electric machine.

FIG. 4 shows a transmission according to a third exemplary embodiment. The transmission represented in FIG. 4 differs from the transmission represented in FIG. 3 in that the third planetary gear set PS3 does not form a front-mounted splitter group VG, but rather a rear-mounted splitter group NG. This means, the third planetary gear set PS3 is drivingly connected downstream from the main group HG, with respect to the power flow from the crankshaft 2 to a further output shaft 3, during a traction operation.

The carrier of the third planetary gear set PS3 is rotationally fixed to the output shaft 3. The sun gear of the third planetary gear set PS3 is rotationally fixed to the further output shaft 6. The further output shaft 6 is rotationally fixed to a traction mechanism carrier (not represented). In addition, the further output shaft 6 is arranged coaxially to the crankshaft 2. The ring gear of the third planetary gear set PS3 is rotationally fixable to the transmission housing 4 with the aid of the fifth shift element S5 and to the sun gear with the aid of the sixth shift element S6.

One further difference is that the transmission includes an electric machine 7 which is operatively connected to the further output shaft 6, as represented by the dashed line. The connection of the electric machine 7 to the further output shaft 6 may take place via a differential drive, a spur gear drive, a chain drive, and/or a belt drive, wherein the connection is not represented in FIG. 4. The connection of the electric machine 7 takes place in an area which is drivingly connected downstream from the rear-mounted splitter group NG.

The electric machine 7 is not designed to be rotationally symmetrical with respect to the crankshaft 2. In particular, the electric machine 7 is offset in the radial direction with respect to the crankshaft 2.

One further difference is that the transmission includes a torque sensor 9, with the aid of which the torque transmitted from the crankshaft 2 to the input shaft 1 can be measured. The torque sensor 9 may be designed in the shape of a disk. Another embodiment and/or arrangement of the torque sensor 9 is also possible, of course.

FIG. 5 shows a table of values for the stationary transmission ratio of the planetary gear sets represented in FIGS. 3 and 4. As is apparent from the table, the first planetary gear set PS1 has a stationary transmission ratio of two (2.0), the second planetary gear set PS2 has a stationary transmission ratio of negative two and six-tenths (−2.6), and the third planetary gear set PS3 has a stationary transmission ratio of negative one and six-tenths (−1.6).

FIG. 6 shows a shift pattern for the transmissions represented in FIGS. 3 and 4. The character "X" indicates the shift elements which are engaged in the particular gear. If the shift element is designed as a free-wheel unit, "X" means the free-wheel unit interlocks. This takes place independently, without an external actuation. The shift elements designed as brakes are engaged with the aid of at least one actuator.

It is also apparent from the shift pattern that the transmissions represented in FIGS. 3 and 4 have eight gears. In addition, the shift pattern indicates the ratio "i" between the crankshaft 2 and the traction mechanism carrier for each gear.

Modifications and variations can be made to the embodiments illustrated or described herein without departing from the scope and spirit of the invention as set forth in the appended claims.

REFERENCE CHARACTERS 1 input shaft
2 crankshaft
3 output shaft
4 transmission housing
5 further input shaft
6 further output shaft
7 electric machine
8 bottom bracket shell
9 torque sensor
S1 third shift element
S2 second shift element
S3 first shift element
S4 fourth shift element
S5 fifth shift element
S6 sixth shift element
HG main group
NG rear-mounted splitter group
VG front-mounted splitter group
PS1 first planetary gear set
PS2 second planetary gear set
PS3 third planetary gear set

The invention claimed is:
1. A transmission for a bicycle, comprising:
at least four shift elements;
one input shaft (1);
a first planetary gear set (PS1) operatively connected to the input shaft (1); and
a second planetary gear set (PS2),
wherein a carrier of the first planetary gear set (PS1) is rotationally fixed to a carrier of the second planetary gear set (PS2),
wherein the input shaft (1) is rotationally fixed to a ring gear of the first planetary gear set (PS1), and
wherein
a ring gear of the second planetary gear set (PS2) is rotationally fixable to the input shaft (1) with a first shift element (S3), and
the ring gear of the second planetary gear set (PS2) is rotationally fixable to a transmission housing (4) with a second shift element (S2).
2. The transmission of claim 1, wherein the carrier of the first planetary gear set (PS1) and the carrier of the second planetary gear set (PS2) are one piece.

3. The transmission of claim 1, wherein:
the first planetary gear set (PS1) is a plus planetary gear set; or the second planetary gear set (PS2) is a minus planetary gear set; or
both the first planetary gear set (PS1) is the plus planetary gear set and the second planetary gear set (PS2) is the minus planetary gear set.

4. The transmission of claim 1, wherein the input shaft (1) is rotationally fixable to a crankshaft (2).

5. The transmission of claim 1, wherein a sun gear of the second planetary gear set (PS2) is rotationally fixable to a transmission housing (4) with a third shift element (S1).

6. A transmission for a bicycle, comprising:
at least four shift elements;
one input shaft (1);
an output shaft (3) fixed to a traction mechanism carrier;
a first planetary gear set (PS1) operatively connected to the input shaft (1); and
a second planetary gear set (PS2),
wherein a carrier of the first planetary gear set (PS1) is rotationally fixed to a carrier of the second planetary gear set (PS2),
wherein
the output shaft (3) is rotationally fixed to a sun gear of the first planetary gear set (PS1), and
the output shaft (3) is rotationally fixable to a sun gear of the second planetary gear set (PS2) with a fourth shift element (S4).

7. A transmission for a bicycle, comprising:
at least four shift elements;
one input shaft (1);
a first planetary gear set (PS1) operatively connected to the input shaft (1);
a second planetary gear set (PS2); and
a third planetary gear set (PS3) operatively connected to the first planetary gear set (PS1), to the second planetary gear set (PS2), or to both the first and second planetary gear sets (PS1, PS2),
wherein a carrier of the first planetary gear set (PS1) is rotationally fixed to a carrier of the second planetary gear set (PS2), and
wherein
a ring gear of the third planetary gear set (PS3) is rotationally fixable to a transmission housing (4) with a fifth shift element (S5),
an element of the third planetary gear set (PS3) is rotationally fixable to another element of the third planetary gear set (PS3) with a sixth shift element (S6), and
wherein the transmission is disposed within a bottom bracket housing that is mountable on the bicycle.

8. A transmission for a bicycle, comprising:
at least four shift elements;
one input shaft (1);
a first planetary gear set (PS1) operatively connected to the input shaft (1);
a second planetary gear set (PS2); and
a third planetary gear set (PS3) operatively connected to the first planetary gear set (PS1), to the second planetary gear set (PS2), or to both the first and second planetary gear sets (PS1, PS2),
wherein a carrier of the first planetary gear set (PS1) is rotationally fixed to a carrier of the second planetary gear set (PS2),
wherein the input shaft (1) is rotationally fixed to a ring gear of the first planetary gear set (PS1), and
wherein
a carrier of the third planetary gear set (PS3) is rotationally fixable to a crankshaft (2) with a further input shaft (5), and
a sun gear of the third planetary gear set (PS3) is rotationally fixable to the input shaft (1).

9. The transmission of claim 1, further comprising an electric machine (7), wherein:
the electric machine (7) is drivingly connected downstream from one or more of the first planetary gear set (PS1), the second planetary gear set (PS2), and a third planetary gear set (PS3); or
the electric machine (7) is operatively connected or operatively connectable to an output shaft (3) or a further output shaft (6); or
both the electric machine (7) is drivingly connected downstream from one or more of the first planetary gear set (PS1), the second planetary gear set (PS2) and the third planetary gear set (PS3), and the electric machine (7) is operatively connected or operatively connectable to the output shaft (3) or the further output shaft (6).

10. A bottom bracket, comprising the transmission of claim 1, wherein the input shaft (1) or a further input shaft (5) is rotationally fixed to a crankshaft (2).

11. A bicycle, comprising the transmission of claim 1, wherein pedals are coupled to a crankshaft (2) of the transmission.

12. A bicycle, comprising the bottom bracket of claim 10.

13. The transmission of claim 6, wherein:
the first planetary gear set (PS1) is a plus planetary gear set; or
the second planetary gear set (PS2) is a minus planetary gear set; or
both the first planetary gear set (PS1) is the plus planetary gear set and the second planetary gear set (PS2) is the minus planetary gear set.

14. The transmission of claim 7, wherein:
the first planetary gear set (PS1) is a plus planetary gear set; or
the second planetary gear set (PS2) is a minus planetary gear set; or
both the first planetary gear set (PS1) is the plus planetary gear set and the second planetary gear set (PS2) is the minus planetary gear set.

15. The transmission of claim 8, wherein:
the first planetary gear set (PS1) is a plus planetary gear set; or
the second planetary gear set (PS2) is a minus planetary gear set; or
both the first planetary gear set (PS1) is the plus planetary gear set and the second planetary gear set (PS2) is the minus planetary gear set.

16. The transmission of claim 6, wherein a sun gear of the second planetary gear set (PS2) is rotationally fixable to a transmission housing (4) with a third shift element (S1).

17. The transmission of claim 8, wherein a sun gear of the second planetary gear set (PS2) is rotationally fixable to a transmission housing (4) with a third shift element (S1).

* * * * *